United States Patent
Bechtel et al.

(10) Patent No.: US 8,146,134 B2
(45) Date of Patent: Mar. 27, 2012

(54) SCALABLE FIREWALL POLICY MANAGEMENT PLATFORM

(75) Inventors: Adam Bechtel, Glade Park, CO (US); Jayanth Vijayaraghavan, Milpitas, CA (US); Kuai Xu, Glendale, AZ (US); Pradeep Hodigere, Sunnyvale, CA (US); Herbert Ong, Cupertino, CA (US)

(73) Assignee: Yahoo! Inc., Sunnyvale, CA (US)

(*) Notice: Subject to any disclaimer, the term of this patent is extended or adjusted under 35 U.S.C. 154(b) by 820 days.

(21) Appl. No.: 12/259,769

(22) Filed: Oct. 28, 2008

(65) Prior Publication Data
US 2010/0107215 A1 Apr. 29, 2010

(51) Int. Cl.
*H04L 9/00* (2006.01)
*G06F 7/04* (2006.01)
*H04L 9/32* (2006.01)
(52) U.S. Cl. ............. 726/1; 726/2; 726/3; 726/4; 726/5; 726/6; 713/182; 713/183; 713/184; 713/185; 713/186
(58) Field of Classification Search .................. 726/1
See application file for complete search history.

(56) References Cited

U.S. PATENT DOCUMENTS
7,185,073 B1 * 2/2007 Gai et al. ............... 709/221

OTHER PUBLICATIONS

Oskar Andreasson, "Iptables Tutorial 1.2.2," 2001-2006. (Available at http://iptables-tutorial.frozentux.net/, last visited on Oct. 28, 2008.).

* cited by examiner

*Primary Examiner* — Longbit Chai
(74) *Attorney, Agent, or Firm* — SNR Denton US LLP

(57) ABSTRACT

Securing large networks having heterogeneous computing resources including provision of multiple services both to clients within and outside of the network, multiple sites, security zones, and other characteristics is provided using access control functionality implemented at hosts within the network. The access control functionality includes respective access control policies for indicating to each host from which other computers it can accept connections. Content of the access control policies can be determined based on application data flow needs, and can draw information from databases including DNS and security zone information for hosts to which the access control policies will be applied. Access control policies can be formatted automatically for different host with different characteristics from the same base logical rule set. Other aspects include using more permissive and/or access control rules provided on network equipment to block known bad data, while providing host-based access control focused on application data flow.

19 Claims, 8 Drawing Sheets

SCALABLE FIREWALL POLICY MANAGEMENT PLATFORM

BACKGROUND

1. Field

The following relates to administration of large scale networks, and more particularly to security concerns in such networks.

2. Description of Related Art

Security of networks and computers served by those networks has long been important. As corporate networks have gotten larger, systems for automating security procedures also have continued to develop. One development is the notion of a firewall that has distributed points of presence to protect a corporate network from intrusions from outside. Network equipment, such as switches and routers, as well as more dedicated network intrusion detection equipment also have become more full-featured, allowing more stateful impactful of packets, better discrimination as to actual content of packets transmitted in a certain protocol, VLANs, and so on.

These improvements have helped security in corporate networks. There is a continued divergence however between the needs of average corporate networks and very large networks. Scalability, support for homogeneity, and other aspects are increasingly critical factors in maintaining security in such very large networks. Further innovations in these areas are desirable, as explained below.

SUMMARY

Aspects include a method of implementing resource access control in a network comprising host computers (hosts) and network equipment allowing the hosts to communicate. The method comprises defining a plurality of security zones, including a more secure zone and a less secure zone, and associating each of the hosts with a respective security zone of the plurality. The method also comprises defining a plurality of roles, and associating one or more of the hosts with each of the roles. Any host can be associated with multiple of the plurality of roles, and each role indicative at least of a common service provided by each of the hosts in that role. The method further comprises receiving a plurality of access requests. Each access request includes a respective first role of the plurality and a respective second role of the plurality, and the method comprises interpreting each of the access requests as requesting that hosts associated with the respective first role have access to the service provided by hosts associated with the respective second role. The method also comprise forming, for each host associated with any second role included in the plurality of access requests, a respective access control policy defining which hosts of the network may access that host. The policy allows access by any host associated with a security zone at least as secure as that host, and which is associated with a first role identified in an access request that includes a second role associated with that host. The method also comprises distributing the access control policies to their respective hosts.

Another aspect relates to a computer network with distributed access control. The network comprises a plurality of security client computers (computers that are clients for the purposes of security provisioning). The client computers are located in multiple physical locations, and each have a connection to a network. The client computers collectively implement a plurality of services; some of the services require information from others of the services. Each client computer is configured for implementing a respective network access control program for controlling network access to that client computer based on a policy comprising one or more Access Control Rules (ACRs). The network also comprises a computer readable storage media storing a plurality of subnet group definitions, wherein each subnet group definition may include a plurality of subnets, and each subnet may include a plurality of the client computers. The network also comprises a computer readable storage media storing security zone information comprising respective associations of client computers to security zones comprising more secure zones and less secure zones. The network further comprises a computer readable storage media storing roles information comprising role definitions associated with one or more subnets. The network further comprises an access rule formation engine configured to receive access control policy requests. The requests identify at least a first role definition and a second role definition, and one or more ports. The engine is further configured to access the security zone information to determine whether each client computer associated with each second role definition is associated with a security zone at least as secure as the client computers associated with the first role definition. The engine is also configured to produce logical access control rules for each client computer specified in the first role definitions, to merge rules containing redundant information, and to output resulting non-redundant rules. The network further comprises a deployment manager to receive the non-redundant rules, to format the rules into client computer specific policies, and permit access by each client computer to its respective policy.

A further aspects includes a method of implementing resource access control in a distributed network. The method comprises, for a network of hosts collectively spanning multiple physical locations and organized into multiple subnets, defining a plurality of security zones, including a more secure and a less secure zone, and associating each of the hosts with a respective security zone of the plurality. The method also comprises defining a plurality of roles, and associating one or more hosts with each of the roles. Any host can be associated with multiple of the plurality of roles, each role indicative at least of a common service provided by each of the hosts in that role. The method also comprises receiving an access request that hosts in a first role of the plurality of roles have permission to access a service provided by hosts of a second role of the plurality. The method also comprises forming, for each host of the second role, an access control policy comprehending both the request that hosts of the first role have permission to access the service provided by hosts of the second role, and the respective security zones associated with each of the hosts of the first role. Each respective access control policy restricts its host from accepting connections from any host of the first role that is associated with a less secure security zone than that host. The method also comprise distributing the respective access control policies to the hosts of the second role.

Still further aspects include a method of administering access control in a distributed network. The method comprises receiving a plurality of access requests. Each request includes logical host identifier information for accessing hosts and accessed hosts. The method comprises forming a respective access control policy for each accessed host comprising components of network address information for accessing hosts specified in each of the plurality of access requests corresponding to that accessed host. The components represent consolidated network address information formed by consolidating the logical information in the plurality of access requests into fewer components. The method also comprises providing for distribution of the access control policies to their respective hosts, for controlling access to that host at that host.

A still further aspect includes a controlled access distributed heterogeneous network. The network comprises a plurality of serving hosts, where each serving host isoperable to serve data corresponding to applications. The serving hosts are interconnected in a network distributed among a plurality of physical locations, each subnet having a plurality of subnets. The network also comprises a plurality of served hosts. The served hosts comprise hosts considered part of the network and hosts accessing the serving hosts through the Internet. Each served host requires access to data corresponding to one or more of the applications. The network comprises a user interface for receiving access control requirements about which of the served hosts require access to data on which of the serving hosts. The network also comprises logic for collecting the access control definitions, and forming respective access control policies for each of the serving hosts. Each of the serving hosts is operable to obtain their respective access control policies and use them in determining which of the served hosts can initiate communication with that respective host, and for what type of communication.

DETAILED DESCRIPTION

The following examples and other description relate to a providing security for large scale networks, such as networks providing large-scale World Wide Web (WWW) presences. Such networks can have many applications, which by necessity are accessible across many geographies. Some such applications need to have access to data produced by other applications, or hosted in other geographies, or on different subnets within the same geography. Such networks also can have distributed systems functionality, to allow distribution of content to an end-user, or even between applications, from points that allow less latency. Also, such networks can be fluid, caused by addition of new applications, changes in how applications are served, acquisitions, hiring and terminating of employees, restructuring of business divisions, and so on. It also would be desirable to support varying levels of trust between different computers within what can be considered one large distributed network. For example, it may be desirable to treat computers of new acquisitions that are brought within the network as well as computers from potentially less secure geographies differently than other computers. Also, certain applications and storage devices have more sensitive information, and so these applications and devices should be treated more securely. Although the following examples and description can relate to addressing one or more of these concerns, embodiments within the scope of the appended claims cannot be restricted only to systems said to address these concerns, as these enumerated concerns are only exemplary.

Security often involves tradeoffs between having a more secure system at the expense of one or more of usability, throughput, and maintenance requirements, and cost. A network can be made more secure by more severe access restrictions, and stronger password requirements, and the like, which can interfere with productivity. It also is the case that more money can be spent on network infrastructure equipment that can be used to police unauthorized network traffic, but such expenditures may come at the expense of profits or other useful ends. In one aspect, the following relates to avoiding burdening network infrastructure equipment with primary responsibility for policing access restrictions in such a network, to help with network scalability, as explained in further detail below.

Figure 1:
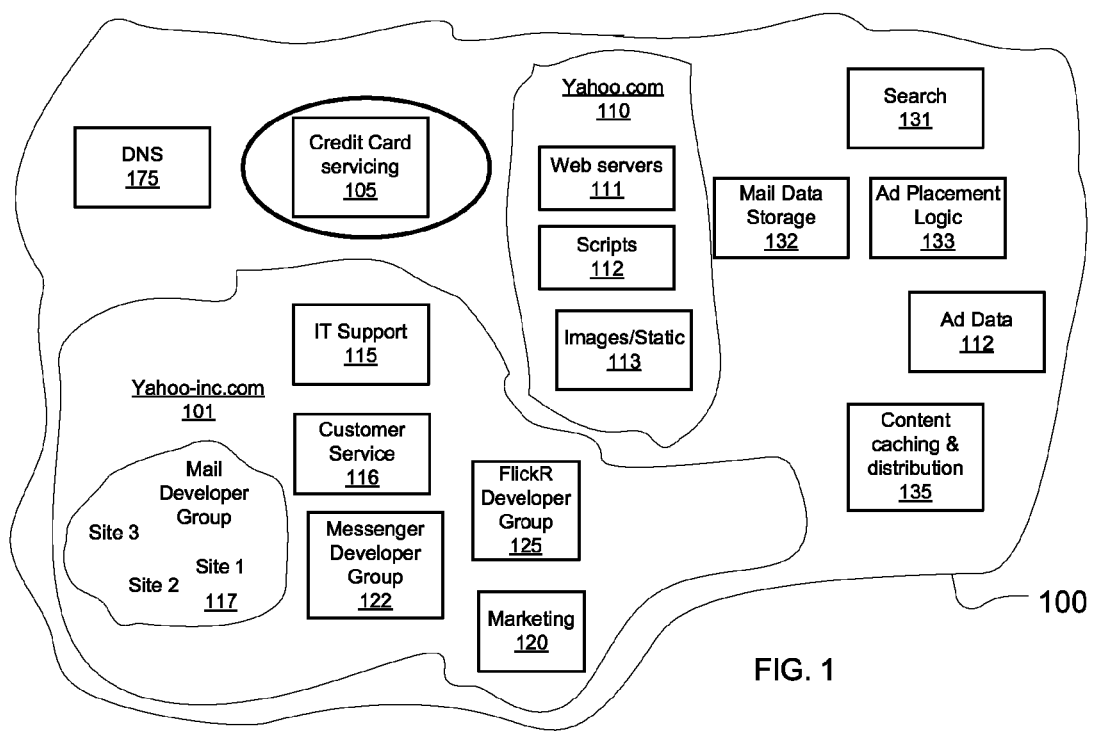
FIG. 1 illustrates a map of a network that may contain various sub-networks, and other machines, which can provide services and/or data to other hosts.

FIG. 1 illustrates a depiction of a variety of applications and sub-networks (some of which can be related to providing the applications) that can be provided in a network 100. The depiction shows that a yahoo-inc.com domain 101 can include various developer, business, and maintenance groups, such as Mail Developer Group 117, IT Support 115, Customer service 116, Messenger Developer Group 122, FlickR Developer Group 125, and marketing 120. Each of these groups and other functional categories can be distributed among multiple physical locations, as illustrated with the example of Mail Developer group 117 being located at sites 1, 2, and 3. This situation can be generalized that any such functionality grouping can be provided at any number of physical locations, each with a separate connection to the Internet, and to other functionality.

For example, DNS 175 can maintain domain name service functionality for some or portions of network 100, serving resolution requests as configured within the network. For example, computers within yahoo-inc.com domain 101 can use DNS 175 as their primary DNS.

As another example, a domain Yahoo.com 110 can include web servers 111, scripts servers 112, and servers for images and static portions of web pages 113. Here also, the actual organization and implementation of these categories of servers can, and would include many physically and/or virtually separate servers, distributed among a number of physical locations. Other devices in the network may not be registered to a particular domain in DNS 175.

Credit card service 105 is a component of importance, since e-commerce transactions are facilitated by having an ability to process credit card authorization requests. Credit card service 105 should be in a secure zone, as described further below, and as such provides an example of a service that should be treated differently than other services within a network.

Examples of other functions include storage for e-mail 132, search algorithm functionality 131, which typically also would include a large amount of storage for indexes of documents found on the Internet, and other documents. Still further examples of services for which storage and processing may need to be provided include logic 133 for placing advertisements on web pages being served. Also, ad data 112 itself may be stored, may be updated from third party sources, and may also be served to web sites or other servers hosted on other domains. As such, each of these servers and other sources of information and services may need to establish connections or accept connections from other hosts, both within a network controlled by a single entity, from affiliated networks, and from unknown networks or hosts.

Also, a large network with services that provide information to distributed locations also may provide a content caching and distribution system 135. Such a system allows requested information to be served from a geographically closer server, reducing latency for such information requests. Such servers also may require controlled access by defined hosts within and without a network.

Figure 2:
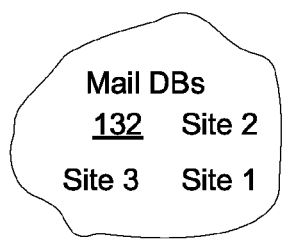
FIG. 2 illustrates that multiple sites can include hosts providing a common service.

Various logical organizations and network topologies can be applied to such a network, some of which are illustrated in FIG. 2. FIG. 2 illustrates that Mail Data Storage 132 can be implemented at multiple sites 1-3. Also, at any given site, many servers can be deployed to provide such functionality. In some cases, these servers can be associated with one or more Internet Protocol (IP) subnets, or another suitable way to subdivide address space for a network (for ease of explanation, IP will be used in examples, although other addressing protocols also may be employed). Servers within a given subnet have an IP address appropriate for that subnet.

Figure 3:
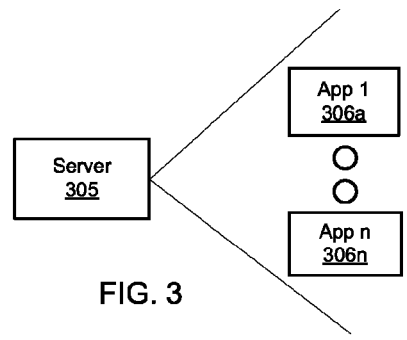
FIG. 3 illustrates that a server can host multiple applications in the context of a network per these examples.

FIG. 3 illustrates that any given server (example of server 305) may run more than one application (here, illustrated applications (services) 306a-306n). Therefore, each server having an IP address within a given subnet also may have a plurality of applications or services. Since a service may be provided from a number of sites, a number of subnets will be associated with that service, and since a number of the devices involved in provision of that service also may provide other services, such subnets may have associations with a variety of applications.

Therefore, different subnets may have servers or other hosts that need to serve data or services to a larger number of other hosts in many different subnets, across multiple physical locations. Also, the hosts to which data and/or services need to be provided may vary both because of network topology changes and also because of the transactional nature of some information services.

Figure 4:
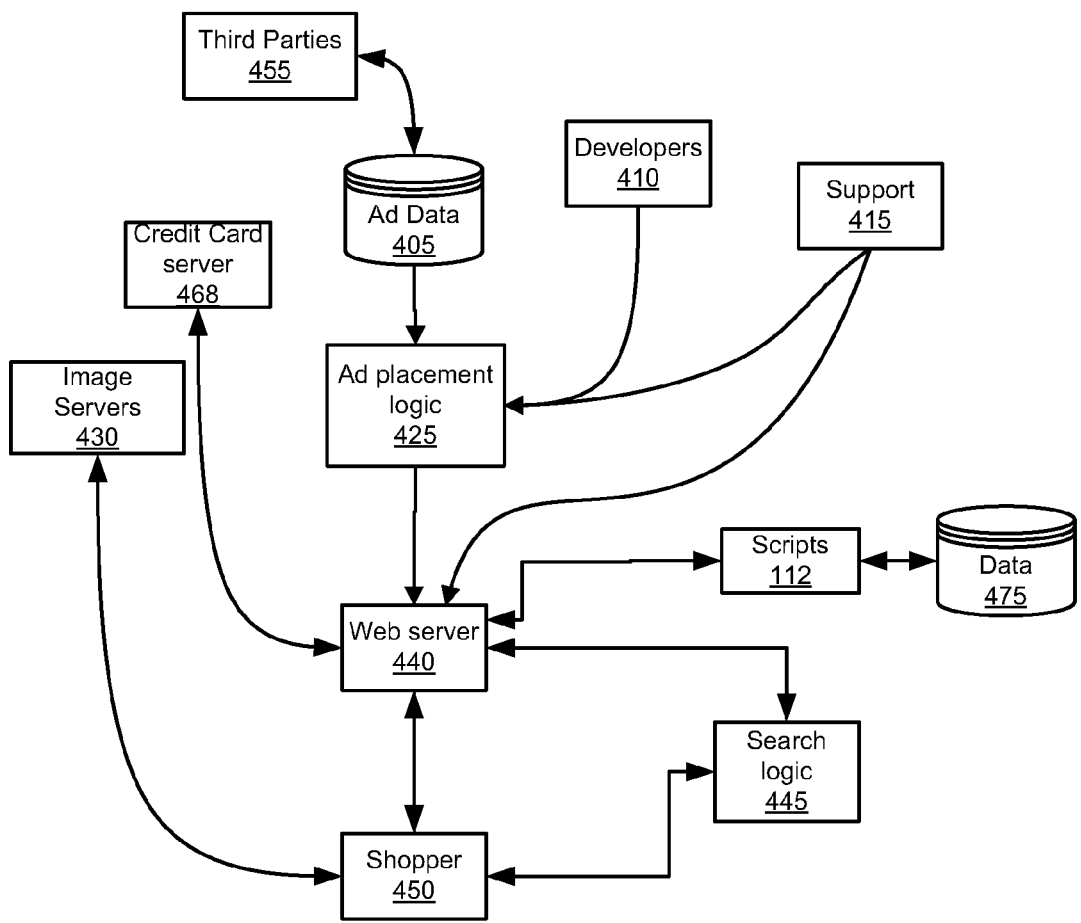
FIG. 4 illustrates an example data flow involving different components, which require information from each other.

FIG. 4 illustrates an example of information flows involving a portion of a network by providing shopping services and related information to a shopper 450 (e.g., a host used by a person attempting to purchase an item or service, the term being used to refer to both the person and the host, or the host). Shopper 450 contacts a web server 440, which typically involves initiating a HTTP session over TCP/IP. This session can involve a web search logic 445 that can provide search results to shopper 450 in response to a query. Thus, shopper 450 can have information flows between web server 440 and search logic 445, which also can communicate with each other. The information provided through web server 440 can come from many different locations. Often, the pages presented from a web server 440 are dynamic pages formed by executed scripts (e.g., scripts stored in script storage 112 that involve querying databases (e.g., databases 475)). For example, arguments obtained through menus of items selectable by shopper 450 can be provided as arguments for script parameters. Web server 440 may receive those parameters, and cause data to be obtained using such scripts.

Also, portions of content served from a page may be determined by ad placement logic 425 that obtains data from ad data storage 405. Such ad data can be provided and/or maintained by third parties 455 responsible for such data. Also, such logic can monitor data received and other indicia of activity by shopper 450 in determining ads to place on pages viewed by shopper 450. Thus, such activity-related data may be gathered by web server 440, for example, which can provide it to ad placement logic 425. Also, other information, such as static page content and images can come from a separate image server 430, where such data can be obtained based on links contained in pages served by web server 440.

Also, if shopper 450 desires to purchase an item, then a means of payment would be required, which can include obtaining authorization for credit card transactions from a secure credit card server 468, or another online payment service. Also, hosts used by support 415 personnel may need to connect to multiple hosts in the system, including web server 440, and ad placement logic 425, and so on. Further, hosts used by developers 410 may need to access other hosts in the network, here illustrated as connecting to ad placement logic 425. As described with respect to FIGS. 1-3, each of these blocks would be comprised of a number of servers that can be distributed among a number of different physical locations.

So, restricting access to those computers authorized to access information, such as the credit card server 468, while denying access to unauthorized users, in a complicated and diverse network can pose a significant challenge.

Figure 5:
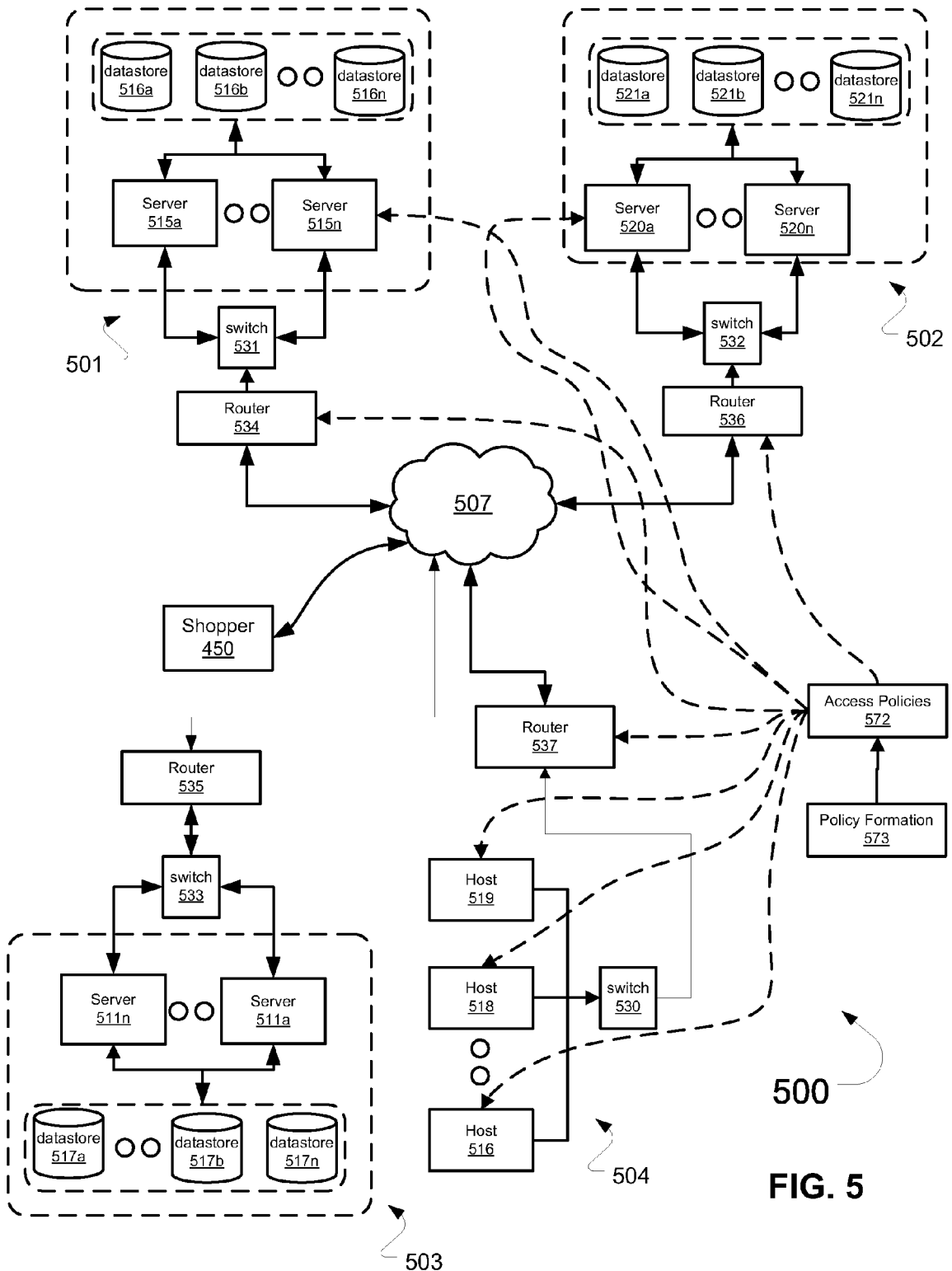
FIG. 5 illustrates an example network implementing many of the concepts described with respect to the previous figures.

FIG. 5 illustrates an example of a network 500 in which the data flows and application interaction shown in FIG. 4 can exist. By necessity, network 500 continues to simplify the many details involved with implementing a network and many of the interconnections that can exist. Network 500 includes elements distributed among four separate locations, 501, 502, 503, and 504. Each location interfaces with an internet 507 (e.g., the Internet) through a respective router, router 537 for location 504, router 535 for location 503, router 536 for location 502, and router 534 for location 501. An actual implementation can have multiple separate routers, or routers that have many components, in order to handle routing workload. Respective routers at each location are shown as interfacing with host computers through respective switches 531, 532, 533, and 530. Since at each site, there can be thousands of hosts, switches 530-533 represent any number of switched ports connected to such hosts, and ultimately communicate to their respective router. For example, there can be collections of 32, 64, or 128 port 10/100 or gigabit Ethernet switches distributed among workgroups that are connected with aggregation switches operating at gigabit or higher bandwidths. Such switches also can include fiber optical networking technologies and the like. Functionally, the switches represent that at each location 501-504 there can be any number of subnets into which the hosts at that location are grouped. The subnets can be formed at a network addressing layer (e.g., IP). Examples of hosts that can be found at each location include servers 515a-515n at location 501, which can communicate with databases 516a-516n, which each can include storage devices and computing resources for receiving data to be stored, and arranging for its storage, as well as retrieving data upon request.

For sake of simplicity, similar computing and data storage facilities are shown at locations 502 and 503, respectively servers 521a-521n and servers 520a-520n, and servers 511a-511n, databases 517a-517n. Location 504 is shown as including switch 530 coupling hosts 516, 518, and 519 to router 537, and then to internet 507. Also shown in FIG. 5 are storage for access policies 572, and a system for policy formation 573, examples of which each will be described in more detail below.

In all of the above cases, the servers, hosts, switches, and so on generally would represent a number of physical and/or logical devices. The servers and hosts can be grouped into subnets at each site. Also, such devices, either individually, or as part of a subnet can be associated with one or more roles that are indicative or otherwise specify a service to be provided from those devices. For example, a role can indicate that the device functions as an e-mail server, or if roles are assigned on a subnet by subnet basis, then a role can indicate that devices within that subnet function as e-mail servers. Roles also can be specified hierarchically such that one role can indicate that a group of devices are e-mail servers, and then within that group, sub-roles can indicate that some of the devices are e-mail servers running one type of operating system or another, for example. Other examples of roles are roles for web servers, security accelerators, script servers, image servers, DNS and DHCP servers, file servers, and so on.

The hosts, servers and data storage facilities can be configured to support the data flow example of FIG. 4 (and other data flows for other applications). For example, FIG. 4 illustrated storage for ad data 405. Ad data 405 can be implemented by specifying a role for ad data storage and assigning that role to one or more storage devices in network 500, such as database 517a, and database 516a, such that multiple locations have ad data 405 storage. Depending on the implementation of the system, other roles that may be instantiated for implementing ad data 405 storage may include servers for interfacing with storage for handling requests ad data requests, and these servers also can be assigned roles appropriately.

By further example, another function in the example application arrangement of FIG. 4 is web serving, represented by web server 440. A web server role can be defined and assigned to server 520a at location 502, and other servers as may be appropriate. Similarly, developers 410 may have roles indicating their respective development responsibilities, and a corresponding role can be created for those responsibilities. For example, developers 410 may specifically be developers for ad logic 425, and so may need to be able to access servers executing such ad placement logic, which also would be assigned a role. As such, application and service responsibilities can be specified by roles, which can be considered as logical constructs that, as will be described below, are translated into more physically specific information that can be used to restrict access to devices in network 500, according to application data flow requirements.

The various dashed lines emanating from access policies 572 illustrate the provision of access policies from access policies 572 to various servers and other hosts in network 500, which will be described in further detail with respect to FIGS. 7-9.

To more easily enable specification of a large number of hosts to be assigned to a particular role, macros can be used to specify groups of hosts and/or groups of subnets that will be associated with a particular role. The association does not need to be exclusive (i.e., more than one role can be associated with a particular macro, and vice versa; also, a host or a subnet can be a part of more than one macro).

Figure 6A:
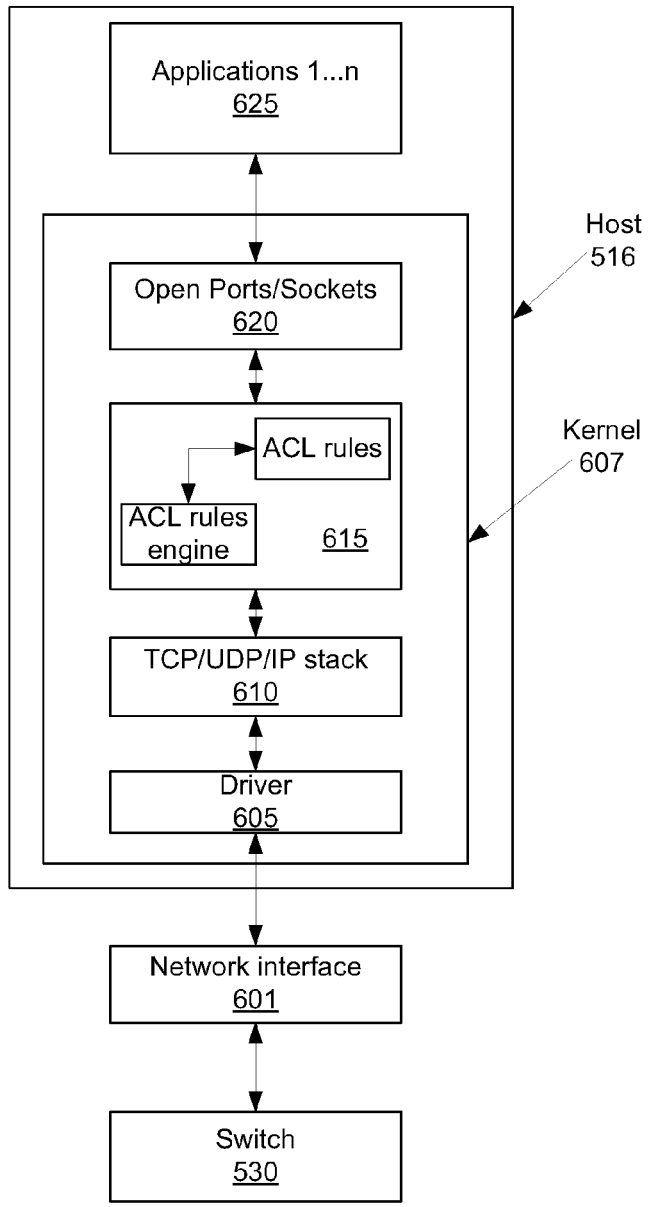
FIGS. 6a and 6b illustrate examples and aspects relating to hosts (computers) shown in previous figures.

FIG. 6a illustrates an example implementation of host 516 (FIG. 5), which communicates with switch 530 through a network interface 601, which can be provided on a motherboard or a network interface card coupled to an expansion port in host 516 (e.g., PCIe, and so on). A driver 605 communicates with network interface 601, interfacing with a TCP/IP stack 610. The TCP/IP (can also have UDP) stack provides IP layer addressing for host 516, such as determining an IP address mapping for host name cached by the IP stack. The TCP part of the TCP/IP stack 610 allows opening and closing of TCP connections, and for the case of UDP, reception of such packets. TCP/IP stack 610 forwards received packets to ACL engine 615, which can be a kernel-level process or plug-in. An open port/socket can represents a logical abstraction that a flow is allowed on that port/socket. Often, such open ports/sockets correspond to a particular type of communication. For example, web traffic generally uses port 80, SSL traffic uses port 443 and so on. Therefore, if ACL engine is programmed with a policy comprising an ACL rule allowing incoming connections from a specified host, macro, or subnet on port 80, then open ports/sockets 620 would represent that such port is open for traffic. The traffic can be sent from and received by applications 625, which represent any number of applications executing on host 516, which can be providing services to hosts on network 500. Aspects of the above-described functionality can be implemented at a kernel level 607.

The determination of the ACL rules defining permissible communications to ACL engine 615 is explained further below, using the example application and data flow of FIG. 4 and network 500.

Figure 6B:
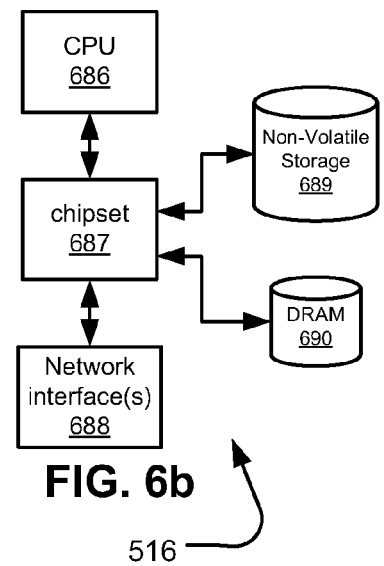

FIG. 6b illustrates a CPU 686 and a chipset 687 interfacing with CPU 686 and with non-volatile storage 689 that can comprise hard disk drives, flash drives, and any other type of persistent storage media. Chipset 687 also interfaces with a DRAM 690, which functions as a working memory. Of course, other configurations and memory architectures can be provided. Chipset 687 also interfaces with one or more network interfaces 688, which can comprise wired and wireless network interfaces, such as Ethernet, IEEE 802.11, Bluetooth, broadband wireless protocols, and so on.

Figure 7:
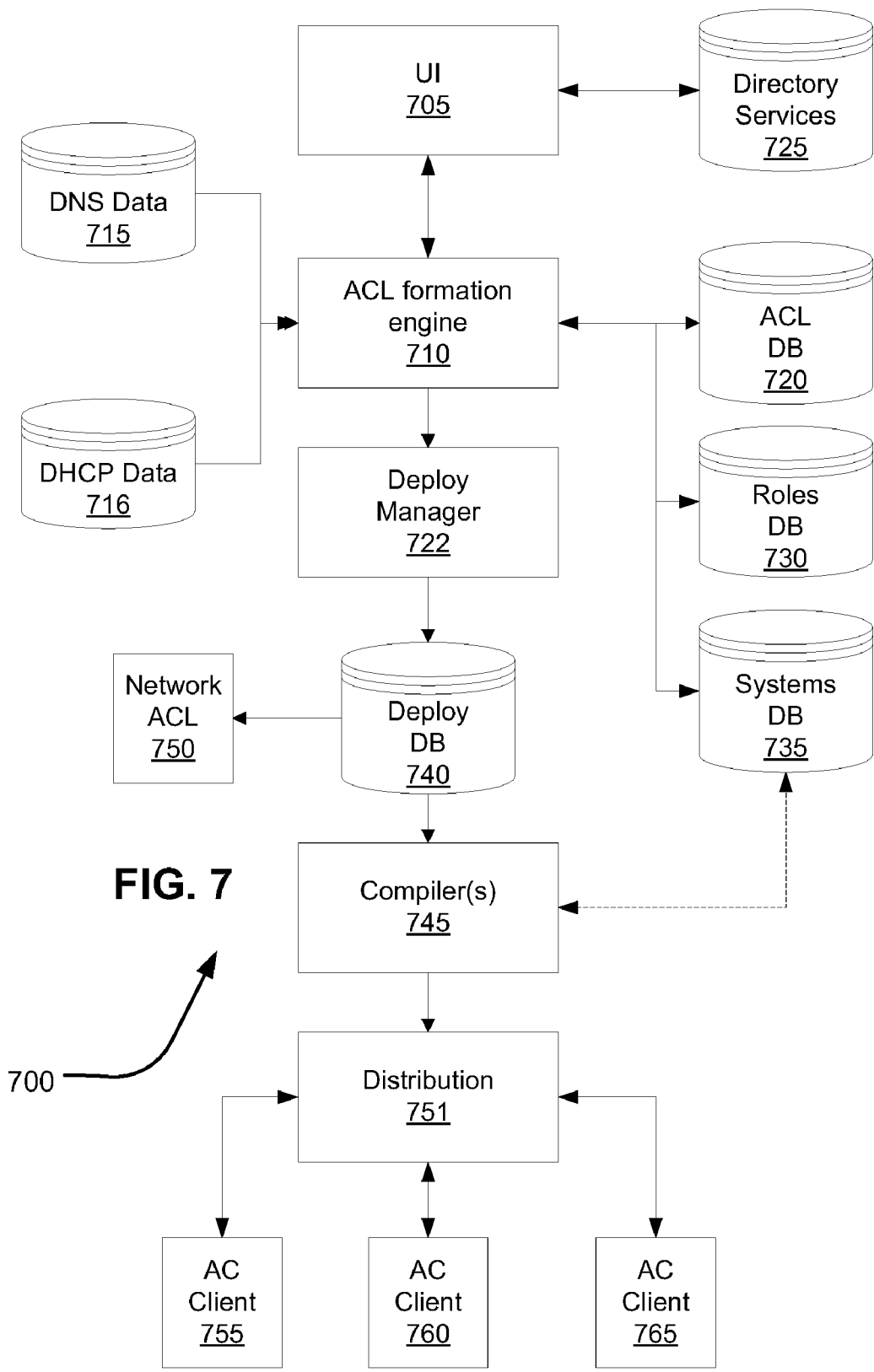
FIG. 7 illustrates a system for forming host-specific access control policies based on depicted information.

FIG. 7 shows a system 700 which can receive high-level logical rules and produce host-specific policies comprising ACL rules. The host-specific policies determine what incoming connections that host can accept (can also control outbound communication initiation if desired). In FIG. 7, any recipient of ACL rules is termed an AC client, and example AC clients 755, 760, and 765 are shown; these AC clients can be any of the servers, hosts or other devices for which network access is to be controlled through the access control examples described herein.

System 700 receives user inputs through a user interface, which can be a structured web interface, and which can present or require acceptable formats in which access control rule requests will be accepted. In some implementations, UI 705 comprises a web interface provided through a web browser that can for example itself be provided on a host illustrated in network 500. To ease user inputting of access control request information, UI may be able to access directory services 725 information, which can include names for hosts and other computing resources in the network. An ACL formation engine 710 interfaces with ACL database 720, a Roles DB 730, and a system DB 735. Examples of data that can be stored in each of these databases is provided below. Other inputs can include DNS data 715, which can be used for resolving physical addresses from logically specified names, and updates relating to DHCP activity or other DHCP data 716. Such DHCP data 716 can help system 700 to detect new systems connecting to a controlled network as well as detecting movement of the system physical system from one subnet to another, to allow appropriate security access changes to be effected to that system. Deployment manager 722 serves to collect rules from engine 710 and submits ready to deploy rules to a deployment database 740.

Systems DB 735 stores subnet information including mapping of IP addresses to subnets in the system, and subnets in the system to a security zone. Information about the hosts, and if desired, network equipment present in the network can be stored. Systems DB 735 also can store host information including to which role or roles each host is associated (as explained below, such information also can be provided in Roles DB 730, organized differently). It was explained above that roles are used as logical relationships between physical devices and applications or other services to be run or provided by those physical devices. For example, web serving, SMTP serving, database transaction processing, image serving, Domain/Name mapping (DNS), IP address assigning (DHCP), file serving, script executing, and so on are a few examples of roles that can exist in a network.

Information about hosts can be stored in the Systems DB 735. For example, what OS is being run, what version of a particular software package that host is running, and so on, can be stored. Still further information includes a respective IP address associated with each host.

Table 1, below illustrates some high-level logical access rules that can be used as a basis for determining access policies for individual hosts in a network (e.g., network 500). As described with respect to FIG. 7, these rules can be provided via a user interface (705). These examples of access rules comprise a field for specifying hosts to function as serving computers (e.g., accepting connections and providing information) and client roles (e.g., those hosts initiating connections to the servers), and specified ports on which such connections can be initiated. In some cases, the ports may be specified based on a type of application data to be transmitted, rather than numbers for ports. For example, rather than specify port 80 for web traffic, the term "web traffic" can be specified, which can include port 80 and potentially port 443 within a definition of ports associated with that kind of data traffic.

Referring to rule 1 of Table 1 and FIG. 4, rule 1 is for causing web servers for the application of FIG. 4 (e.g., web server 440) to accept web connections from hosts located on the Internet on ports 80 and 443. Since Table 1 provides a high-level logical ruleset, hosts to which rule 1 applies is not yet determined, but such hosts may be determined according to the examples provided.

High-level rule 2 provides an additional example of rule format, which can include direct specification of subnets in either or both of the server and client roles. Rule 3 illustrates a rule allowing an internal flow between a FlickR database server and a FlickR web server on port 3306. Similarly, rule 5 is for allowing the store web servers to receive remote Telnet connections from hosts associated with a store support role (e.g., host 415, FIG. 4.) Various other rules can and would be specified in a larger network with more hosts and potentially more applications, capabilities and functions being provided in a given network. For example, web server 440 of FIG. 4 could both be permitted to establish a connection and receive a connection from scripts server 112, and high-level rules would be established to that end. As explained below, these high-level rules are used as inputs to process(es) for establishing host-specific rules.

TABLE 1

| Rule | Server Role(s) | Port(s) | Client Role(s) |
|---|---|---|---|
| 1 | Store_Web_Servers | Ports 80, 443 | Internet |
| 2 | flick_web_servers | 80 | Internet |
| 3 | flick_database_servers | 3306 | flick_web_servers |

TABLE 1-continued

| Rule | Server Role(s) | Port(s) | Client Role(s) |
|---|---|---|---|
| 4 | shopping_ad_servers | Port 8080, 4443 | Store Web Servers |
| 5 | Store_Web_Servers | Port 107 | Store_Support |

Figure 8:
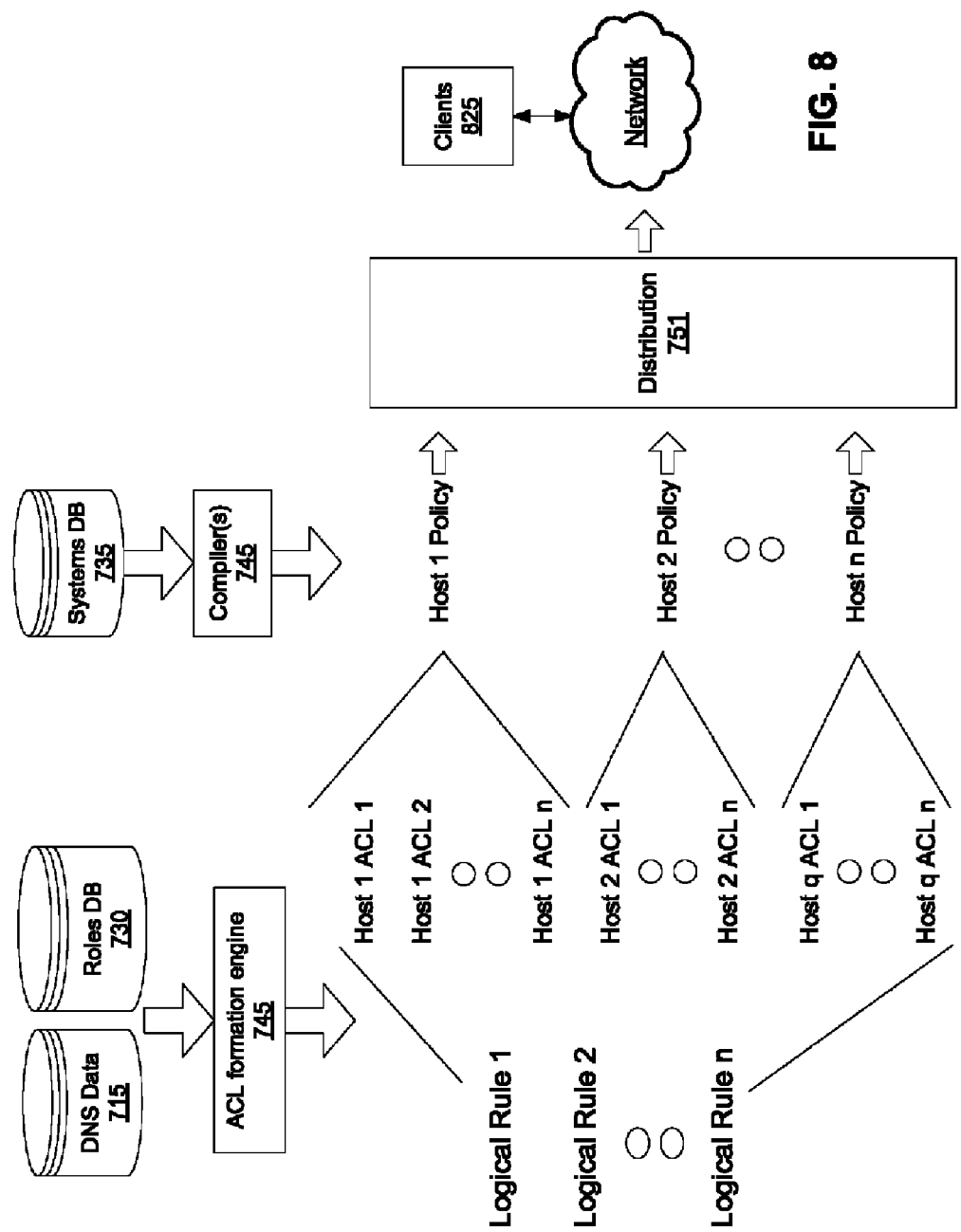
FIG. 8 illustrates a flow of high-level logical access control requests to lower-level access rules, and ultimately to host-specific policies.

FIG. 8 illustrates an example flow of high-level, logically specified rules, such as those of Table 1, to individual host policies for deployment/installation at hosts for which access control is managed in the network. The example flow of FIG. 8 focuses primarily on processing new, high-level rules to produce from them host-specific rules (as opposed to revisions to existing rules). FIG. 8 illustrates that from a plurality of high-level logical rules 1-n, ACL formation engine 710 inputs DNS data and data from Roles DB 730 to expand these high-level rules into potentially separate pluralities of rules for each of a number of hosts, illustrated as Host 1 ACL 1-n through Host q ACL 1-n.

For example, as shown in Table 1, rule 1 specifies that a role store_web_servers should accept connections from any host identified as being part of or a member of a role Internet. Similarly, rule 3 specifies that hosts identified as being part of role flick_database_servers should accept connections on port 3306 from hosts identified as being part of role flick_web_servers (i.e., an "internal" flow between hosts considered part of the network, in contrast with rule 1, which would be considered as an "external" flow, allowing the network to accept connections from the Internet).

As shown in FIG. 7, ACL formation engine 710 would receive rules such as these, for example, through user interface 705. Then, ACL formation engine 710 uses role to host mapping information from Roles DB 730 to identify hosts in each specified role. Table 2, below, shows a few examples of information that can be stored in Roles DB 730. These examples show that a role can be identified as a database record, and that record can have multiple fields specifying subnets of hosts that are provide data or services associated with that role. The port specification in Table 2 is an example of an implementation where a logical role description an include port information, such that the port information is conveyed also by the role specification. In such cases, the port information shown in Table 1 can be populated by the information from Roles DB 730. Alternatively, the macro_1 role specifies no port information, and would instead be used to identify a grouping of hosts that may not have any particular service or application associated with it at this time (of course, the same subnets could also be part of a different role, which does supply such port information). So, if the Roles DB 730 includes port information for a given role, then it can be used, and if it doesn't then such information would be required to be inputted through the UI, for example.

Although individual hosts can also be specified, for large scale networks, with many hosts providing a given type of data or service, subnet specification would be more efficient, in general.

TABLE 2

| Role | Member | Member | Port |
|---|---|---|---|
| store_web_servers | Subnet 209.191.010.0/X | Subnet 209.191.011.0/X | 80, 443 |
| shopping_ad_servers | Subnet 209.191.001.0/X | Subnet 209.191.080.0/X | 3306 |
| macro_1 | Subnet 209.191.100.0/X | | |

Components of host-specific control policies also can include baseline access control requirements. For example, baseline rules may include allowing secure shell (SSH) connections from specified maintenance hosts, allowing DNS servers to accept queries from all hosts other than those with a lowest security level, and other common considerations relating to network management in general, rather than application-specific or services specific information requirements. In this way, network administrators for the entire network can handle these concerns, allowing others to concern themselves only with their own applications.

Another aspect of information to be comprehended in permitting a given access rule request to be implemented includes security zone information. Such information is one type of information that can be included in systems DB 735. Table 3, below, illustrates an example of information that can be stored in systems DB 735. Table 3 shows that the systems DB 735 can include entries of subnets, and one or mores specific sets of ports, to which can be applied a specific security zone. In this example, the security zones can be considered to proceed from Z0 (least trusted) to Z5 (most trusted or most secure). The security zone information is used by ACL formation engine 710 to determine whether or not to allow a specific connection. In particular, a host attempting to connect to a given port must have a security zone at least as great as the port to which that host is attempting to connect. The example of table 3 also illustrates that macro information can be used to identify hosts or groups of hosts for the purposes of zone specification. Also, port information need not be included, and if not included then all ports for hosts in that entry would be associated with the same security zone.

TABLE 3

| Subnet/macro/host/host name | Port(s) | Security Zone |
|---|---|---|
| Subnet 209.191.010.X | 80, 443 | Z0 |
| Subnet 209.191.001.X | 3306 | Z3 |
| macro_1 |  | Z0 |

With these inputs, ACL formation engine 710 can generate lower-level host ACL rules (still having logical information), which can be used or changed as follows. One consideration is that these separate, lower-level rules for each host can be redundancy or at least partially redundant, such that a policy comprehending the rules for a given host can have fewer distinct rules specified, which can allow for quicker processing of such rules by that host.

Also, FIG. 8 illustrates that because the hosts to which these ACL rules are to apply can be implemented in any number of different ways, e.g., using different operating systems, the rules still are to be compiled into a form that can be used by each different type of host, as explained below.

Compilers 745, using host-specific information from Systems DB 735 produces access control policies for the hosts. These policies can be distinct for each host, and there also can be one policy that can apply to a class of hosts, which can be captured in a macro. For example, a macro can identify each host running a variant of Linux that functions as a web server. A different macro can identify hosts running FreeBSD which function as web servers. Macros can also be hierarchical. In any case, compilers 745 receive low-level, logical rules for each host and produce rules that can be implemented by access control facilities provided in a given host.

For example, some operating systems may provide kernel-level functionality for filtering IP packets according to prescribed rules. The required formatting to use this functionality may vary between operating systems, and compilers 745 would take into account such implementation requirements. Once host-specific policies are formulated, these policies can be provided through a deployment process, such as one executed by the distribution mechanism 751 of FIG. 7, which can comprise a plurality of servers, and load balancing logic to spread requests for policies and/or policy updates by AC clients 755, 760, and 765, thereby allowing access-controlled hosts to connect over a network, or other connections.

Host-specific access policies also can be produced in view of access control functionality provided on network infrastructure equipment. The access control functionality can provide a baseline of network packet filtering. Then, particular host devices would not need to separately block such traffic. FIG. 7 illustrates formation of network ACLs 750.

In view of the flow of FIG. 8, and the system of FIG. 7, methods related to implementing new access control policies and updating access control policies are described below.

Figure 9:
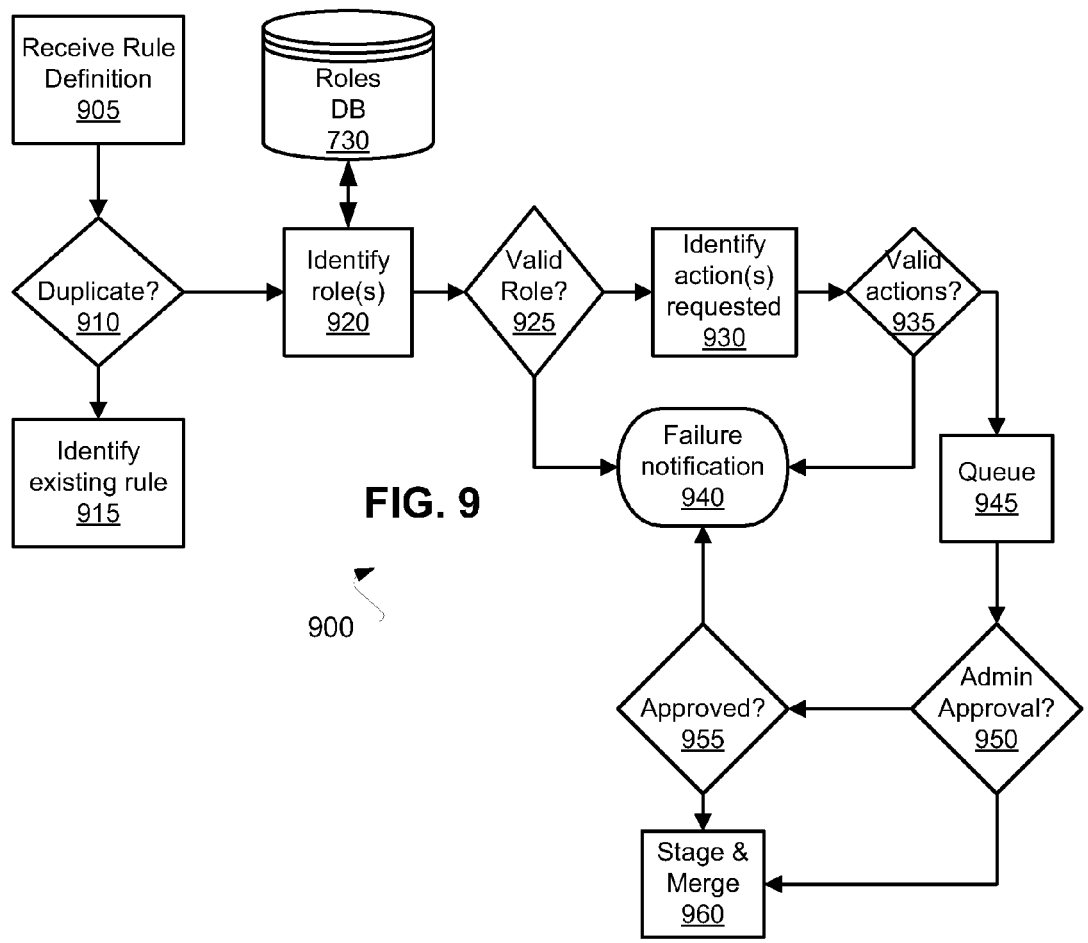
FIG. 9 illustrates a method of forming host policies from access requests.

FIG. 9 describes aspects of a method 900 allowing intake and other processing of new access rules that will be comprehended in a host's access control policy (comprising one or more access control rules). Method 900 comprises receiving (905) a high-level rule definition (high-level compared with other rule types, as explained above), which can include receiving a specification of a serving rule (Table 1), from which is to be provided data, applications, or other information to hosts of an identified served role. For example, in the context of FIG. 4, a rule can be provided relating to the flow between shopper 450 and web server 440. Method 900 can include determining (910) whether the logical rule contains duplicate information for another rule, and if the accepted rule is duplicative with a pre-existing rule, then that pre-existing rule can be identified (915) for informational purposes to a source of the high-level rule definition. If not duplicative, then roles contained in the logical rule definition are identified (920), and used to query Roles DB 730 for obtaining information about hosts associated with each role specified in the high-level rule definition. This information can be used in determining whether the rule is valid (925) and if valid then actions specified in the logical rule definition are identified (930). It is then determined (935) whether these action(s) are valid. Invalid actions can include security zone mismatches, where the requested access asks that a more secure host or port on a host accept a connection from a less secure host.

If either roles or actions from the high-level rule are invalid then a failure notification can be generated (940). As explained above, invalidity can occur for a number of reasons, including that the role itself is not an entry in Roles DB 730, or that DNS data for names specified in Roles DB 730 does not resolve, and so on. In this example, such invalidity is a cause for stopping method 900, but method 900 also can continue with partially valid data, and output an indication of partial failure as well.

Without failure, the actions and roles identified are queued (945) for an administrative approval (950), if required, and which if granted (955) causes staging and potential merging (960) of rules (and that the received logical rule definition. If the approval is not granted, then failure notification (940) is conducted. If no administrative approval is required, then the rule can be staged and merged, as necessary (960). Thus, a new access rule posed as a high-level of roles and actions can be received and processed into host-specific policies comprising access rules to be enforced by each respective host.

A different aspect is maintaining access control rules during the inevitable changes that occur in a large-scale network. For example, new server installations may be added, hosts may be reconfigured, guest hosts may come and go, and so on. It would be desirable to provide functionality to allow ACL formation engine 710 to comprehend such events, and adjust policies accordingly.

Figure 10:
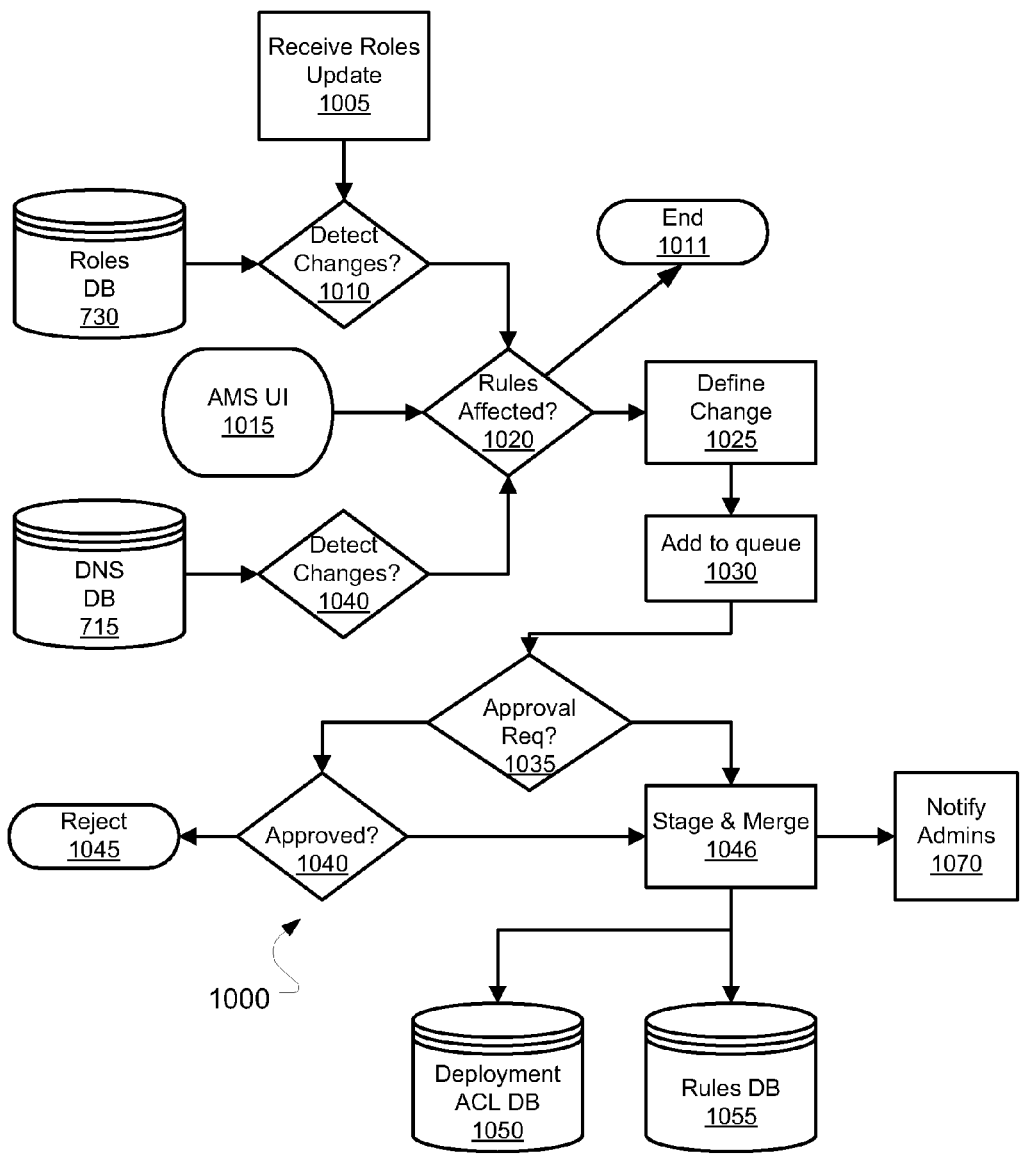
FIG. 10 illustrates a method for revising host policies based on depicted and described changes and other inputs.

FIG. 10 illustrates a method 1000 relating to maintaining access control rules in view of detected changes to DNS information, DHCP information, roles information, as so on, as well as change requests received through user interface(s). In method 1000, a roles update can be received 1005, and in view of roles information from database 730, changes to one or more existing access control policies can be detected (1010). For example, a role update can include adding or deleting a subnet to a role definition shown in the example of Table 1. Inputs also can be received (1015) through a user interface, and it can be determined (1020) whether such inputs affect any access control rules. No detected changes or UI inputs have an effect on any rules, then method 1000 can end (1011). If there are changes, then the changes can be defined (1025). For example, the an addition of another server to a role definition would result in a change that would be defined as requiring addition of access control rules associated with servers of that role definition. Since there may be many logical rules that need to be comprehended in policies for each of the hosts, changes to policies caused by the identified changes can be queued (1030), and where approval is required (1035), approval can either be obtained (1040/1046), resulting in staging and merging (1046), or denied, resulting in rejection of changes (1045). Where changes are staged and merged, then administrative authorities also can be notified (1070). Subsequently, the deployment process can continue by producing host-specific policies for each host, which comprehend the changes (1050), and the logical rules used to generate the host-specific policies can be stored in the Rules DB 1055.

Different networks can be combined or otherwise integrated into a network being access controlled according to this description by monitoring data flows between servers in the network. For example, it can be determined which computers are making connections to other computers, and on what ports. As a collection of computers, the IP addresses can be considered as a group, and then in some cases it can be inferred from the nature of data flows what application or service is being supported. A role can be created for such machines for that application. Then, high-level access rules can be formulated using that role, and used to form policies for computer-by-computer (host-based) access control, per the above examples.

In the above descriptions, hosts, including servers of data and applications, as well as machines used by people, such as desktops, laptops, cellular phones, personal information devices, and so on, can all be considered security clients which receive access control policies which those clients enforce by a local enforcement mechanism.

Methods, programs, and systems according to the above examples can help increase implementation of parallel view updating to create derived data. Examples may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. A "tangible" computer-readable medium expressly excludes software per se (not stored on a tangible medium) and a wireless, air interface. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps. Program modules may also comprise any tangible computer-readable medium in connection with the various hardware computer components disclosed herein, when operating to perform a particular function based on the instructions of the program contained in the medium.

Those of skill in the art will appreciate that embodiments may be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The invention claimed is:

1. A method of implementing resource access control in a network comprising host computers (hosts) and network equipment allowing the hosts to communicate, comprising:

defining a plurality of security zones, including a more secure zone and a less secure zone, and associating each of the hosts with a respective security zone of the plurality;

defining a plurality of roles, and associating one or more of the hosts with each of the roles, wherein any host can be associated with multiple of the plurality of roles, each role indicative at least of a common service provided by each of the hosts in that role;

receiving a plurality of access requests, each access request including a respective first role of the plurality and a respective second role of the plurality;

interpreting each of the access requests as requesting that accessing hosts associated with the respective first role have access to the service provided by accessed hosts associated with the respective second role;

formulating, for each accessed host associated with any second role included in the plurality of access requests, a respective access control policy defining which accessing hosts of the network may access said accessed host, the policy allowing access by any given accessing host associated with one of said plurality zones at least as secure as said accessed host, and said given accessing host is associated with a first role identified in an access request that includes a second role associated with said accessed host; and distributing the formulated access control policies to the respective accessed hosts of the second role.

2. The method of claim 1, wherein each policy comprises a plurality of access control rules, and further comprising assembling a first set of rules for a particular host, detecting overlap between rules of the first set and combining rules that overlap into fewer distinct rules for inclusion in the policy for that host.

3. The method of claim 1, wherein distributing includes allowing hosts to request updates to their respective access control policies.

4. The method of claim 1, wherein distributing includes distributing access control policies for a host to a server from which that host is operable to obtain its access control policies.

5. The method of claim 1, wherein distributing includes distributing access control policies for a host to a server from which that host is operable to obtain its access control policies.

6. The method of claim 1, further comprising maintaining access control policies on pieces of network equipment in the network, wherein host access control policies generally are more restrictive than access control policies for the network equipment.

7. The method of claim 6, wherein the access control policies for the pieces of network equipment provide for blocking of known bad network traffic, while host access control policies generally pertain to restricting acceptable application data flows only to authorized hosts.

8. The method of claim 1, further comprising translating role information into physically meaningful device identification information, and using that physically meaningful device identification in access control policies distributed to hosts.

9. The method of claim 1, further comprising accessing Domain Name data for translating logical name information into network address information.

10. The method of claim 1, further comprising accessing Domain Name data for translating logical name information contained in each of the roles into a plurality of network addresses.

11. The method of claim 1, further comprising identifying, from among the plurality of access requests, requests that, when translated into network address information, can be combined to allow fewer distinct components of an access control policy for a host.

12. A computer network system with distributed access control, comprising:
a plurality of security client computers, the client computers located in multiple physical locations, each having a connection to a network and configured for implementing a respective network access control program for controlling network access to that client computer based on a policy comprising one or more Access Control Rules (ACRs), the client computers collectively implementing a plurality of services, wherein some of the services require information from others of the services;
a non-transitory computer readable storage media storing a plurality of subnet group definitions, wherein each subnet group definition may include a plurality of subnets, and each subnet may include a plurality of the client computers;
the storage media storing security zone information comprising respective associations of client computers to security zones comprising more secure zones and less secure zones;
the storage media storing roles information comprising role definitions associated with one or more subnets;
an access rule formation engine configured to receive access control policy requests, the requests identifying at least a first role definition for accessed hosts and a second role definition for accessing hosts, and one or more specified ports, to access the security zone information to determine whether each client computer associated with each second role definition is associated with a security zone at least as secure as the client computers associated with the first role definition, to produce logical access control rules for each client computer specified in the first role definitions, to merge rules containing redundant information, and to output resulting non-redundant rules, wherein the access control rules comprise one or more fields for specifying the accessing hosts, the accessed hosts and the specified ports on which connections can be initiated; and
a deployment manager to receive the non-redundant rules, to format the rules into client computer specific policies, and permit access by each client computer to its respective policy.

13. A method of implementing resource access control in a distributed network, comprising:
for a network of hosts collectively spanning multiple physical locations and organized into multiple subnets, defining a plurality of security zones, including a more secure and a less secure zone, and associating each of the hosts with a respective security zone of the plurality;
defining a plurality of roles, and associating one or more hosts with each of the roles, wherein any host can be associated with multiple of the plurality of roles, each role indicative at least of a common service provided by each of the hosts in that role;
receiving an access request that accessing hosts in a first role of the plurality of roles have permission to access a service provided by accessed hosts of a second role of the plurality;
formulating, for each accessed host of the second role, an access control policy comprehending both the request that accessing hosts of the first role have permission to access the service provided by accessed hosts of the second role, and the respective security zones associated with each of the accessing hosts of the first role, the respective access control policies restricting its accessed host from accepting connections from any accessing host of the first role that is associated with a less secure security zone than that accessing host; and
distributing the formulated respective access control policies to the accessed hosts of the second role.

14. The method of 13, further comprising receiving a plurality of the access requests, and in forming access control policies for each host of respective second roles, consolidating identification of hosts of corresponding first roles, resulting in fewer distinct components for the access control policies.

15. A method of administering access control in a distributed network, comprising:
receiving a plurality of access requests, each including logical host identifier information for accessing hosts and accessed hosts;
forming a respective access control policy for each accessed host comprising components of network address information for accessing hosts specified in each of the plurality of access requests corresponding to that accessed host, the components representing consolidated network address information formed by consolidating the logical information in the plurality of access requests into fewer components;

formulating, for each accessed host associated with any second role included in a plurality of access requests, a respective access control policy defining which accessing hosts of the network may access said accessed host, the policy allowing access by any given accessing host associated with one of said plurality zones at least as secure as said accessed host, and said given accessing host is associate with a first role identified in an access request that includes a second role associated with said accessed host; and providing for distribution of the formulated access control policies to the respective accessed hosts of the second role, for controlling access to the accessed host at said accessed host.

16. A controlled access distributed heterogeneous network system, comprising:

a plurality of serving hosts, each serving host operable to serve data corresponding to applications, the serving hosts interconnected in a network distributed among a plurality of physical locations, having a plurality of subnets;

a plurality of served hosts, each served host requiring access to data corresponding to one or more of the applications, the served hosts comprising hosts considered part of the network and hosts accessing the serving hosts through the Internet;

a user interface for receiving access control requirements about which of the served hosts require access to data on which of the serving hosts;

logic for collecting the access control definitions, and forming respective access control policies for each of the serving hosts, wherein an access rule formation engine configured to receive access control policy requests, the requests identifying at least a first role definition for serving hosts and a second role definition for served hosts, to access the security zone information to determine whether each client computer associated with each second role definition is associated with a security zone at least as secure as the client computers associated with the first role definition, to produce logical access control rules for each client computer specified in the first role definitions; and each of the serving hosts is operable to obtain their respective access control policies and use them in determining which of the served hosts can initiate communication with that respective host, and for what type of communication.

17. The network of claim 16, wherein the logic is operable to receive updates to one or more of domain name server information and dynamic host configuration protocol information, and update the access control policies based on the updates.

18. The network of claim 16, wherein the logic is operable to provide baseline access controls in each of the access control policies, and to provide host-specific additions to the baseline access controls.

19. The network of claim 16, wherein the network comprises a plurality of network infrastructure devices operable to interconnect serving hosts, and to control data forwarding in the network, the network infrastructure devices provided with data forwarding policies for restrict known bad data traffic, and the access control policies are directed to controlling application-specific dataflows.

* * * * *